US008800431B2

(12) United States Patent
Sullivan et al.

(10) Patent No.: US 8,800,431 B2
(45) Date of Patent: *Aug. 12, 2014

(54) METHOD AND APPARATUS FOR BEVERAGE FORMATION WITH RESERVOIR ACCESS CONTROL

(75) Inventors: Kevin P. Sullivan, Sherborn, MA (US); Ian Tinkler, Wakefield, MA (US)

(73) Assignee: Keurig Green Mountain, Inc., Waterbury, VT (US)

( * ) Notice: Subject to any disclaimer, the term of this patent is extended or adjusted under 35 U.S.C. 154(b) by 1051 days.

This patent is subject to a terminal disclaimer.

(21) Appl. No.: 11/899,952

(22) Filed: Sep. 7, 2007

(65) Prior Publication Data

US 2008/0095904 A1  Apr. 24, 2008

Related U.S. Application Data

(60) Provisional application No. 60/843,012, filed on Sep. 7, 2006.

(51) Int. Cl.
*A23L 2/00* (2006.01)
*A47J 31/44* (2006.01)

(52) U.S. Cl.
USPC .................................. 99/280; 99/300; 99/316

(58) Field of Classification Search
CPC ....... A47J 31/32; A47J 31/4407; A47J 31/58; A47J 31/56; A47J 31/46
USPC ....... 99/300, 306, 307, 302 R, 275, 295, 280, 99/316; 426/77, 433
See application file for complete search history.

(56) References Cited

U.S. PATENT DOCUMENTS

| 4,143,589 A | 3/1979 | Weber |
| 4,644,855 A | 2/1987 | Woolman et al. |
| 4,674,400 A | 6/1987 | Rondel et al. |

(Continued)

FOREIGN PATENT DOCUMENTS

| JP | 2002-535640 | 10/2002 |
| JP | 2005-028143 A | 2/2005 |
| WO | WO 2007/050315 | 5/2007 |

OTHER PUBLICATIONS

Extended European Search Report application No. 09165407.9-1258, dated Oct. 15, 2009.

(Continued)

*Primary Examiner* — Jianying Atkisson
(74) *Attorney, Agent, or Firm* — Wolf, Greenfield & Sacks, P.C.

(57) ABSTRACT

A method and apparatus for forming a beverage. Movement of a brew chamber may automatically enable the provision of beverage precursor liquid into a reservoir in a brewer, which is then used (heated or not) to form a beverage. For example, closing of the brew chamber may cause a lid for a water reservoir to be fully opened or otherwise permit movement of the lid to allow access to the reservoir, allowing a user to provide water into the reservoir. The reservoir lid may open with an abrupt action, causing attention to be drawn to the reservoir lid. In another arrangement, closure of the brew chamber may cause actuation of a baffle, pump, valve or other device to provide a suitable amount of water to a reservoir for beverage formation. In another arrangement, opening of the brew chamber may cause the reservoir lid to be automatically and simultaneously opened with the brew chamber.

1 Claim, 9 Drawing Sheets

(56) References Cited

U.S. PATENT DOCUMENTS

| | | | |
|---|---|---|---|
| 4,714,011 A | 12/1987 | Ly | |
| 4,825,759 A | 5/1989 | Grome et al. | |
| 5,044,261 A | 9/1991 | Kawazoe et al. | |
| 5,083,504 A | 1/1992 | Koga et al. | |
| 5,197,374 A | 3/1993 | Fond | |
| 5,327,815 A | 7/1994 | Fond et al. | |
| 5,392,694 A | 2/1995 | Muller et al. | |
| 5,704,275 A | 1/1998 | Warne et al. | |
| 6,000,317 A | 12/1999 | Van Der Meer et al. | |
| 6,082,247 A | 7/2000 | Beaulicu | |
| 6,098,525 A | 8/2000 | Gijzel et al. | |
| 6,142,063 A | 11/2000 | Beaulieu | |
| 6,240,832 B1 | 6/2001 | Schmed et al. | |
| 6,606,938 B2* | 8/2003 | Taylor | 99/295 |
| 6,672,200 B2 | 1/2004 | Duffy et al. | |
| 6,820,771 B2 | 11/2004 | Lassota et al. | |
| 6,840,407 B2 | 1/2005 | Lassota et al. | |
| 6,935,222 B2* | 8/2005 | Chen et al. | 99/302 R |
| 6,990,891 B2 | 1/2006 | Tebo, Jr. | |
| 7,146,904 B2 | 12/2006 | Scribner | |
| 2002/0144603 A1 | 10/2002 | Taylor | |
| 2004/0195263 A1 | 10/2004 | Lassota | |
| 2005/0056153 A1 | 3/2005 | Nottingham et al. | |
| 2005/0145112 A1* | 7/2005 | Scribner | 99/279 |
| 2005/0193892 A1 | 9/2005 | Rahn et al. | |
| 2006/0011066 A1 | 1/2006 | Bunn et al. | |
| 2007/0186780 A1 | 8/2007 | Clark | |
| 2008/0072766 A1 | 3/2008 | Kobylarz | |
| 2010/0203207 A1 | 8/2010 | Clark | |

OTHER PUBLICATIONS

Examination report dated Jul. 17, 2009 from New Zealand Patent Application No. 576528.

ISR & Written Opinion, Appl. No. PCTUS2007/019574, mailed Jan. 21, 2009.

Notice of Preliminary Rejection (Non-Final) dated Oct. 11, 2010 for Korean Application No. 10-2009-7006979 and English translation thereof (5 pages).

International Preliminary Report on Patentability and Written Opinion issued Mar. 10, 2009 for PCT/US2007/019574 (9 pages).

Examiner's Report dated May 31, 2012 for Canadian Application No. 2,689,795 (3 pages).

English translation of the Notice of Grounds for Rejection, mailed Jan. 17, 2012, for Japanese Patent Application No. 2009-117943 (2 pages).

* cited by examiner

METHOD AND APPARATUS FOR BEVERAGE FORMATION WITH RESERVOIR ACCESS CONTROL

This application claims the benefit of U.S. Provisional Application 60/843,012, filed Sep. 7, 2006, which is hereby incorporated by reference in its entirety.

BACKGROUND

Some types of beverage forming devices, such as coffee brewers, use a cartridge containing a beverage medium, e.g., ground coffee, to form a beverage. In coffee brewers of this type, water is heated by the brewer and introduced into the cartridge. The water infuses with the coffee in the cartridge, and the beverage formed is removed from the cartridge for consumption. Many coffee brewers of this type commonly require a user to provide water to the machine that is used to form the beverage.

SUMMARY OF INVENTION

The inventors have appreciated that in some applications, users of a beverage forming device, such as a coffee brewer, may need to be reminded of the need to provide water to the brewer. For example, with brewers used by hotel guests in their room, the guests may not be familiar with the brewer operation, and proper reminders regarding the need to provide water may help avoid user frustration or failure to properly operate the device. In other embodiments, it may be desirable to keep the brewer empty of water between uses. Again using the hotel brewer context as an example, it may be preferable to maintain the brewer empty of water between uses, e.g., because several hours or days may pass between uses. Requiring a user to provide fresh water at the time of use may help to provide a higher quality beverage.

One aspect of the invention relates to a method of brewer operation, which may include placing a brew cartridge in the brewer, and then closing a brew chamber to at least partially enclose the cartridge. Closing of the brew chamber may automatically enable the providing of water or other beverage precursor liquid into a reservoir in the brewer, which is then used (heated or not) with the cartridge to form a beverage. For example, closing the brew chamber may cause a lid for a water reservoir to be fully opened or otherwise moved to allow access to an access opening of the reservoir, allowing a user to provide water into the reservoir. The reservoir lid may open with an abrupt action, causing attention to be drawn to the reservoir lid. In one embodiment, the lid may open with a spring action, e.g., to help further draw attention to the water reservoir and the need to provide water. Such a feature may be useful in certain embodiments, such as brewers arranged to form one cup of beverage at a time and thus requiring water to be provided for each brew cycle. In another embodiment, closure of the brew chamber may cause actuation of a baffle, pump, valve or other device to provide a suitable amount of water to a reservoir for beverage formation.

In another aspect of the invention, a beverage formation device may include a brew chamber for receiving a beverage cartridge and have a lid that is movable between open and closed positions to open and close the brew chamber. The brew chamber may be adapted to substantially enclose a beverage cartridge with the lid in a closed position. A reservoir may hold a beverage precursor liquid, such as water, and have a lid that is movable to open and close an access opening through which precursor liquid is provided into the reservoir. A heater may heat the precursor liquid that is provided to the brew chamber, and a lid control mechanism may lock the reservoir lid in a position to block access to the access opening while the brew chamber lid is open, and unlock the lid to allow access to the access opening when the brew chamber lid is moved from the open position to the closed position.

In another aspect of the invention, a brewer may be configured so that when a user opens a brew chamber, e.g., to place a cartridge in the brewer, a lid of a water reservoir is also opened simultaneously and automatically with opening of the brew chamber. After placement of the cartridge in the brew chamber and the brew chamber is closed, the lid of the water reservoir may remain open, e.g., to help remind a user to provide water to the brewer. The open reservoir lid may include a sound, sign display, or other indication to the user to provide water for the brew cycle, e.g., a visible marking, such as printed text "Add Water" to help guide the user's operation of the device.

In another aspect of the invention, a method for operating a brewer includes providing a brew cartridge, providing water in a reservoir for beverage formation, closing a lid to close the access opening and pneumatically seal the reservoir, heating the water, and providing the water to the cartridge to form a beverage. Water may be provided into the reservoir by a user pouring the water through a reservoir access opening. The pneumatic seal may be provided by a silicone rubber gasket between the lid and reservoir body and/or any other suitable arrangement. Pneumatic sealing of the reservoir may allow the water in the reservoir to be expelled from the reservoir for flow to the brew chamber by introducing air pressure into the reservoir, e.g., by an air pump. The reservoir may be vented during heating of the water, e.g., to allow steam or other gases to escape, and during pressurization of the reservoir and delivery of the brew water. However, the venting arrangement may be constructed to allow a suitably small amount of gas to escape so as to allow successful delivery of the brew water to the brew chamber. As a result, heating of the water and the attendant steam creation or other pressure generation, may not cause delivery of water to the cartridge. Instead, such pressure may be vented and the water delivered to the cartridge when appropriate. Such an arrangement may avoid the need for providing controlled venting, e.g., by way of a controllable valve, yet still permit pressurized delivery of water from the reservoir.

In another aspect of the invention, a beverage formation device may include a brew chamber for receiving a beverage cartridge and have a lid that is movable between open and closed positions to open and close the brew chamber. The brew chamber may be adapted to substantially enclose a beverage cartridge with the lid in a closed position. A reservoir may hold a beverage precursor liquid and have a lid that is movable to open and close an access opening through which precursor liquid is provided into the reservoir. The lid may be adapted to pneumatically seal the reservoir access opening in a closed position, and thereby pneumatically seal the reservoir so that liquid in the reservoir may be delivered by pressurizing the reservoir. A heater may heat the precursor liquid that is provided to the brew chamber, e.g., by way of a heater in the reservoir.

In another aspect of the invention, a method for operating a brewer includes providing a brew cartridge, providing water in a reservoir, providing a brew indication to begin a brewing cycle, heating the water, detecting when the water is heated to a desired temperature, and then providing the water to the cartridge to form a beverage based on the detected temperature. In one embodiment, detection of the water temperature is performed by a temperature cut off switch (TCO) which is normally closed to provide power to a water heater, but opens when the water reaches a predetermined temperature. Opening of the TCO may cause the brewer to deliver the heated water to the cartridge. For example, the brewer may include an air pump that pneumatically pressurizes the water reservoir in response to opening of the TCO switch, thereby forcing the heated water to the cartridge. Such an arrangement may provide for a simplified control mechanism.

In another aspect of the invention, a method for forming a beverage includes providing a brew indication to cause a brewer to begin a brew cycle, delivering power to a heater to heat precursor liquid in a reservoir of the brewer, detecting the temperature of the precursor liquid during heating, interrupting power to the heater based on detecting that the precursor liquid is heated to a desired temperature, and delivering the precursor liquid from the reservoir based on interrupting power to the heater. Thus, control of delivery of water from the reservoir may be made based on power interruption to the heater, thereby ensuring that the heater is not operating while water is being delivered from the reservoir. This feature may help prevent damage to the heater or other components that might be caused by operating the heater without having sufficient water present to receive the heat generated, especially in devices that empty the reservoir of liquid during each brew cycle.

In another aspect of the invention, a beverage forming machine includes a brew chamber for receiving a brew cartridge, a reservoir for receiving precursor liquid for use in forming a beverage, and a brew indication switch for receiving an indication from a user to begin a brewing cycle. The brew indication switch may take any suitable form, such as a power button that a user may press to initiate a brew cycle, a switch that detects closure of a lid for the reservoir, a cup sensor that detects the presence of a cup or other vessel to receive a beverage, etc. The machine may also include a heater for heating precursor liquid in the reservoir, a detector for detecting a desired temperature of precursor liquid in the reservoir, an air pump for providing pressurized air to the reservoir, and a controller constructed and arranged to control operation of the heater and the air pump. The controller may be adapted to control the heater to heat the precursor liquid and cause the air pump to deliver pressurized air to the reservoir when the detector detects that the precursor liquid is at the desired temperature.

These and other aspects of the invention will be apparent from the following description and claims.

BRIEF DESCRIPTION OF THE DRAWINGS

Aspects of the invention are described with reference to the following drawings in which like numerals reference like elements, and wherein.

DETAILED DESCRIPTION

Figure 1:
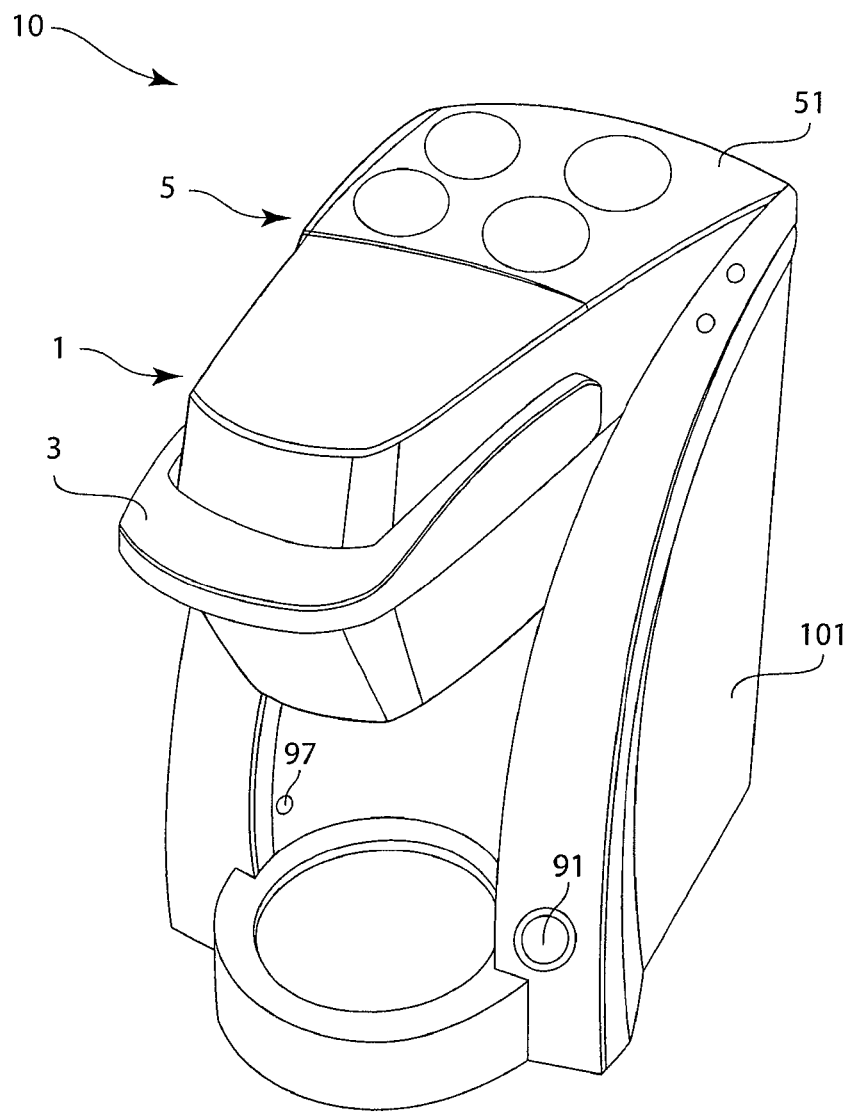
FIG. 1 is a perspective view of a beverage formation device in accordance with aspects of the invention.

Various aspects of the invention are described below and/or shown in the drawings. These aspects of the invention may be used alone and/or in any suitable combination with each other. Aspects of the invention are not limited in any way by the illustrative embodiments shown and described herein.

As used herein, a "cartridge" may take any suitable form, such as a pod (e.g., opposed layers of filter paper encapsulating a beverage medium), capsule, sachet or any other arrangement. The cartridge may be impervious to air and/or liquid, or may allow water and/or air to pass into the cartridge. The cartridge may include a beverage medium, such as tea, ground coffee, powdered milk, a drink mix, and/or any other suitable material for forming a beverage. The cartridge may include a filter or other arrangement to help prevent some portions of the beverage medium from being provided with the formed beverage, such as a coffee drink, tea, hot chocolate, etc. To "brew" a beverage includes infusion, mixing, dissolving, steeping or otherwise forming a drinkable substance using water or other beverage precursor (e.g., flavored or otherwise treated water, or other liquid) with a beverage medium. Also, reference to "water" herein is to any suitable water formulation, e.g., filtered, deionized, softened, etc., as well as any other suitable precursor liquid used to form a beverage, such as sweetened or flavored water, milk, etc.

FIG. 1 shows a beverage forming device 10 that incorporates various aspects of the invention. This illustrative embodiment includes a housing 101 that encloses various parts of the device 10 and supports several external features, such as a power button 91, a cup sensor 97 (e.g., a photosensor) and/or other optional features. A brew chamber 1 may be opened, e.g., by lifting a handle 3, so that a beverage cartridge may be inserted into the brew chamber 1 for forming a beverage. In this regard, the device 10 may operate, for example, as shown in U.S. Pat. No. 7,165,488, which is hereby incorporated by reference. That is, lifting the handle 3 may cause a brew chamber lid (not shown in FIG. 1) to be raised so that a cartridge receiver may tilt forward to receive a beverage cartridge. Of course, it should be understood that the brew chamber 1 may be opened in other ways, such as by push button actuation of a motor-driven mechanism, manual opening of a drawer that slides outwardly to receive a cartridge, and so on.

In one aspect of the invention, the device 10 may automatically enable provision of water or other precursor liquid used to form a beverage into a reservoir 5 (e.g., used for water heating) in response to closing of the brew chamber 1. For example, a user may lift the handle 3 or otherwise cause the brew chamber 1 to open. After placing a fresh cartridge in the brew chamber 1, the user may cause the brew chamber 1 to close, e.g., by pressing down on the handle 3, pushing a control button that actuates a motor drive to close the brew chamber 1, etc. Upon movement of the brew chamber toward the closed position, a lid 51 of the reservoir 5 may open, allowing a user to access to the reservoir 5. With access to the reservoir 5, a user may pour water or other liquid into the reservoir 5 through an access opening exposed by the open lid 51. Of course, provision of water or other liquid to the reservoir 5 may occur in other ways, and a user need not provide the liquid into the reservoir 5. For example, liquid may be provided in response to brew chamber closing by opening of a valve in a water supply line that feeds the reservoir 5. The water supply line may run from a storage tank on the device 10 or from a plumbed connection to a domestic water supply. In such embodiments, a lid 51 for the reservoir 5 need not be provided since a user need not have access to the reservoir 5. However, in this embodiment, the reservoir 5 receives water or other liquid by a user pouring the liquid through an access opening exposed by opening of the reservoir lid 51. In accordance with this aspect of the invention, the device 10 may be effectively empty of water between uses, and have fresh water provided to the brewer in response to initiation of closure of the brew chamber 1, which may signify a user's desire to form a beverage.

In another aspect of the invention, a lid 51 of a reservoir 5 may open simultaneously and automatically with opening of the brew chamber 1. For example, the lid 51 of the reservoir 5 may pivot upwardly to expose an access opening for the reservoir 5 when the user takes action to open the brew chamber 1, thereby allowing a user to pour water into the reservoir 5. Simultaneous and automatic opening of the brew chamber 1 and the reservoir 5 may be controlled by a lid control mechanism, e.g., that unlatches the reservoir lid 51 from a locked closed position allowing the lid 51 to open under a spring bias in response to lifting of the handle 3 and opening of the brew chamber 1. Other arrangements for the lid control mechanism are possible, such as a motor-driven linkage that operates to open the lid 51 and the brew chamber 1 in response to a user's press of a button, mechanical or electro-mechanical latching devices that unlatch the brew chamber 1 and lid 51 allowing the brew chamber and lid 51 to open under a spring bias, and others.

Figure 2:
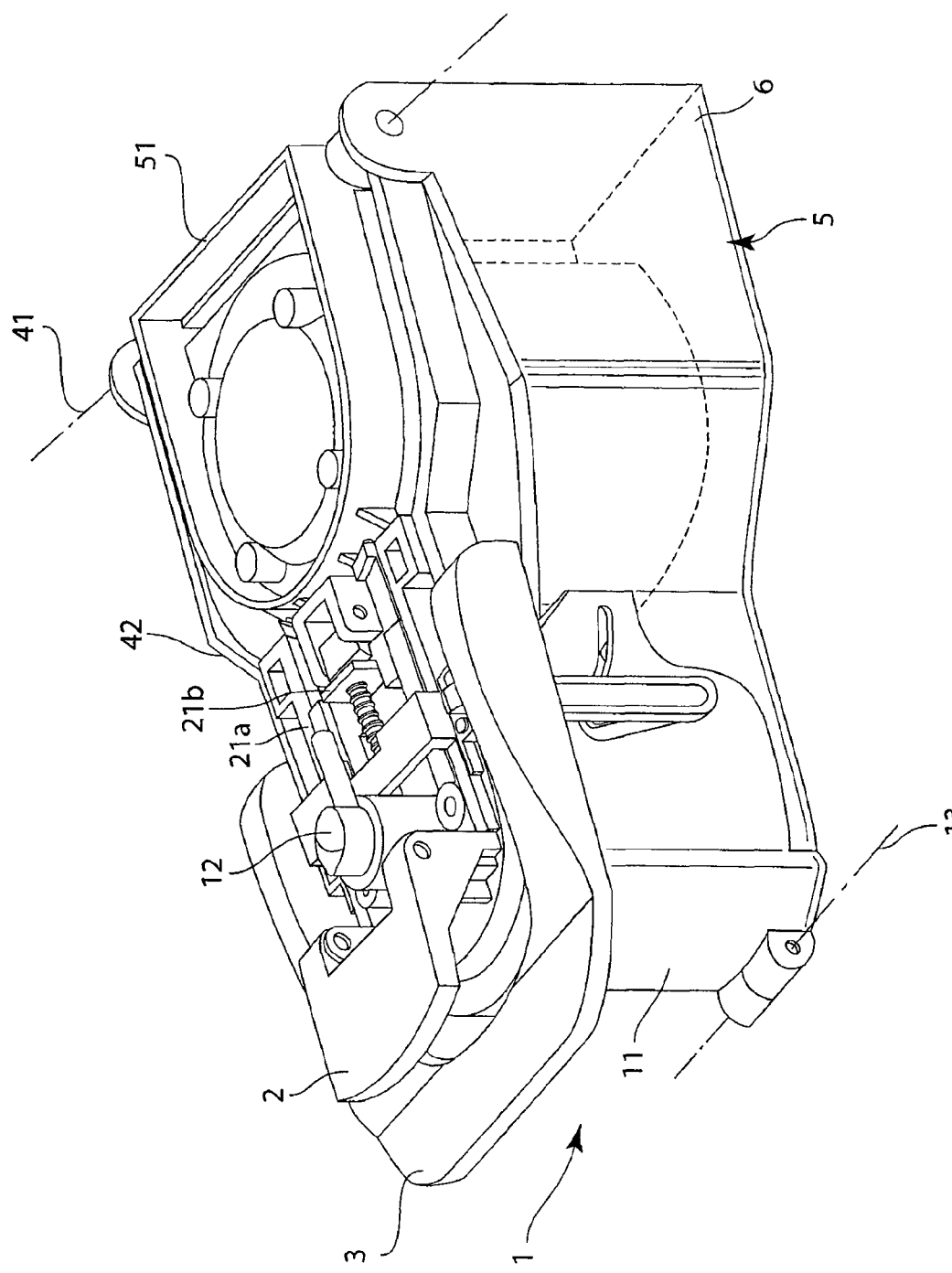
FIG. 2 is a perspective view of selected components of the beverage formation device of FIG. 1.
Figure 3:
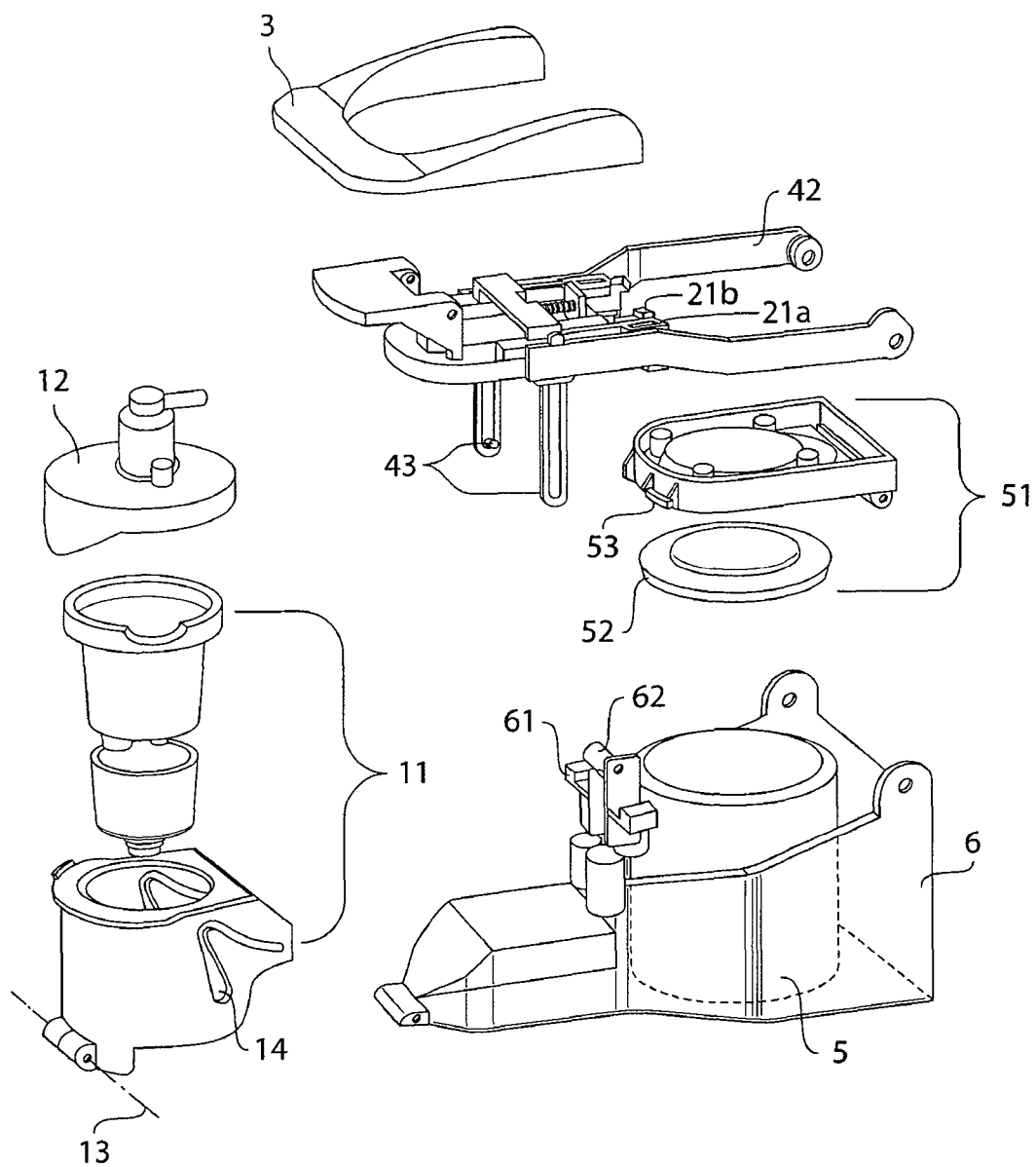
FIG. 3 is an exploded view of the portion of the beverage formation device shown in FIG. 2.

To further illustrate these and other aspects of the invention, FIG. 2 shows a schematic view, and FIG. 3 shows an exploded view, of selected components of the device 10 shown in FIG. 1 with the housing 101 removed. Reference is made to FIGS. 2 and 3 to illustrate aspects of the invention, but no limitation on such aspects of the invention is intended. For example, arrangements are described for movement of a brew chamber lid and a reservoir lid 51, but aspects of the invention are not limited to the embodiments described, e.g., neither the brew chamber 1 nor the reservoir 5 need have a lid in some aspects of the invention. Also, it should be understood that the device 10 likely would include other parts that are not shown here for purposes of clarity.

In the illustrative embodiment shown, the handle 3 is fixed to a lid carrier 42 that is pivotally mounted to a frame 6 at an axis 41. The frame 6 may form a skeleton of the device 10, supporting the housing 101 as well as other components of the device 10. The lid carrier 42 has mounted to it a brew chamber lid 12 and a reservoir lid 51 that cover an opening in a beverage cartridge receiver 11 and an access opening in the reservoir 5, respectively. The brew chamber lid 12 may be fixed relative to the lid carrier 42, and thus may move to open or close the brew chamber 1 with movement of the lid carrier 42. The reservoir lid 51 may be moveably mounted on the lid carrier 42, e.g., so that the lid 51 may pivot about the axis 41. Thus, the reservoir lid 51 may pivot or otherwise move relative to the container part of the reservoir 5 to expose the access opening of the reservoir 5.

In this illustrative embodiment, opening of the brew chamber 1 is initiated by depressing a lever 2, which releases a locking arrangement 21 that engages a portion 61 of the frame 6 to lock the lid carrier 42 in the closed position and prevent lifting of the handle 3. However, such locking of the lid carrier 42 may be performed using other arrangements, or may not be provided at all. In some cases, locking of the lid carrier 42 or otherwise resisting opening of the brew chamber 1 may help the device 10 resist the pressures developed in the brew chamber 1 during beverage formation. In this embodiment, the locking arrangement 21 includes a first slider 21a that can move forward and back on the lid carrier 42 and is biased by a spring or other resilient member to move in the forward direction. Thus, depression of the lever 2 overcomes the bias of the spring or other element, and causes the first slider 21a to move rearwardly and disengage the portion 61 of the frame 6. Of course, it should be understood that locking of the lid carrier 42 may be accomplished in other ways, such as by a detent mechanism, other latch constructions, linkages, etc.

Lifting of the handle 3 pivots the lid carrier 42 about the axis 41 to expose the opening in the cartridge receiver 11 and partially lift the reservoir lid 51 with respect to the access opening in the reservoir 5. However, with the reservoir lid 51 locked in place relative to the lid carrier 42, the access opening is not exposed to allow liquid to be provided into the reservoir 5 even with the lid carrier 42 fully raised. The lid 51 is locked in place by a second slider 21b of the locking arrangement 21 that is slidably mounted on the lid carrier 42. The second slider 21b is biased, e.g., by a spring, to move rearwardly and engage tab portions 53 on the lid 51, thereby keeping the lid 51 in place relative to the lid carrier 42. However, with forward movement of the slider 21b, the lid 51 is released and may be moved to expose the access opening of the reservoir 5. As discussed in more detail below, engagement of the slider 21b with a portion 62 of the frame 6 as the lid carrier 42 is moved downwardly to close the brew chamber 1 causes the slider 21b to move forwardly toward the handle 3 and unlock the lid 51. In this embodiment, the lid 51 is spring biased to pivot upwardly and away from the lid carrier 42 so that upon release of the lid 51, the lid 51 moves abruptly to an open position. In other embodiments, the lid 51 need not be spring biased, but may be moved by hand, by motor drive or other arrangement. Also, the lid 51 need not necessarily pivot about the axis 41, but instead may pivot about any other suitably arranged axis, may slide side-to-side or forward-to-back, or move in any other way to exposed/cover the access opening. Likewise, the lid carrier 42 is not required, and the brew chamber lid 12 and reservoir lid 51 may be separately mounted to the frame 6 or other member. Alternately, the lid carrier 42 may move in other ways, such as with a sliding motion, a non-pivoting up and down motion, etc. In short, aspects of the invention are not limited in the way that the brew chamber is opened/closed and/or the way that the access opening to the reservoir is opened or covered to prevent access to the reservoir.

In accordance with an aspect of the invention, the reservoir lid 51 may be arranged to pneumatically seal the reservoir 5 when the lid 51 is in a closed position relative to the access opening of the reservoir 5. By pneumatically sealing the reservoir 5, the liquid in the reservoir 5 may be caused to flow to the brew chamber 1 by pressure in the reservoir 5, e.g., air pressure introduced by an air pump or other means. In this embodiment, the lid 51 includes a silicone rubber seal 52 that engages with the container portion of the reservoir 5, but other sealing arrangements are possible, such as an interference or other close fit, other gasket arrangements, etc.

As also described in more detail below, in this embodiment, the lid carrier 42 includes a pair of depending arms 43 that each have a pin that engage with corresponding slots 14 in the cartridge receiver 11. As the lid carrier 42 and arms 43 move upwardly, engagement of the arms 43 with the slots 14 causes the receiver 11 to tilt forward about an axis 13. It should be understood that the receiver 11 may be tilted forward in other ways, such as by hand, a motor driven mechanism, or other arrangement. Alternately, the receiver 11 may remain stationary.

Figure 4:
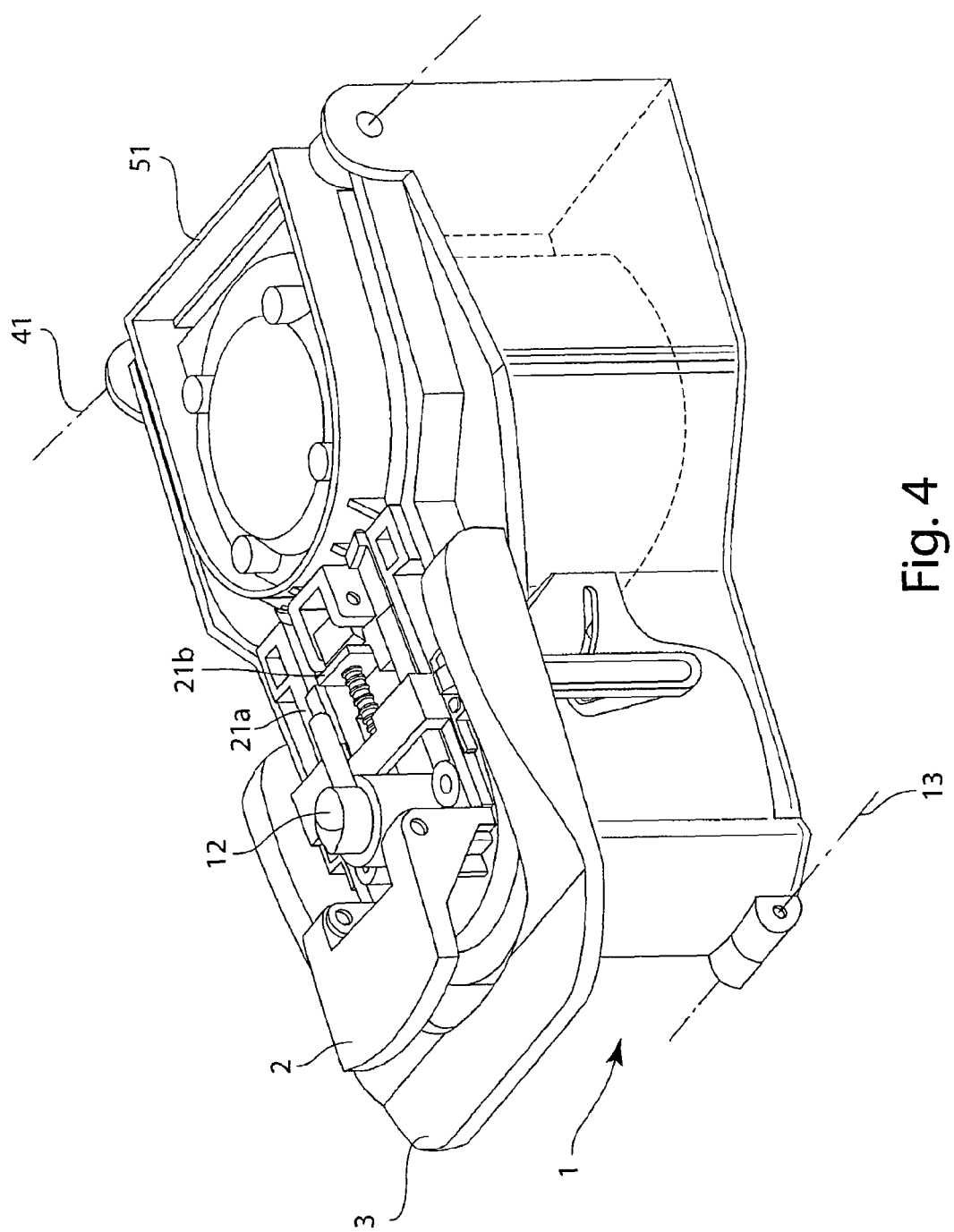
FIGS. 4-8 show the portion of the of the beverage formation device shown in FIG. 2 in various states of opening and closing operations.
Figure 5:
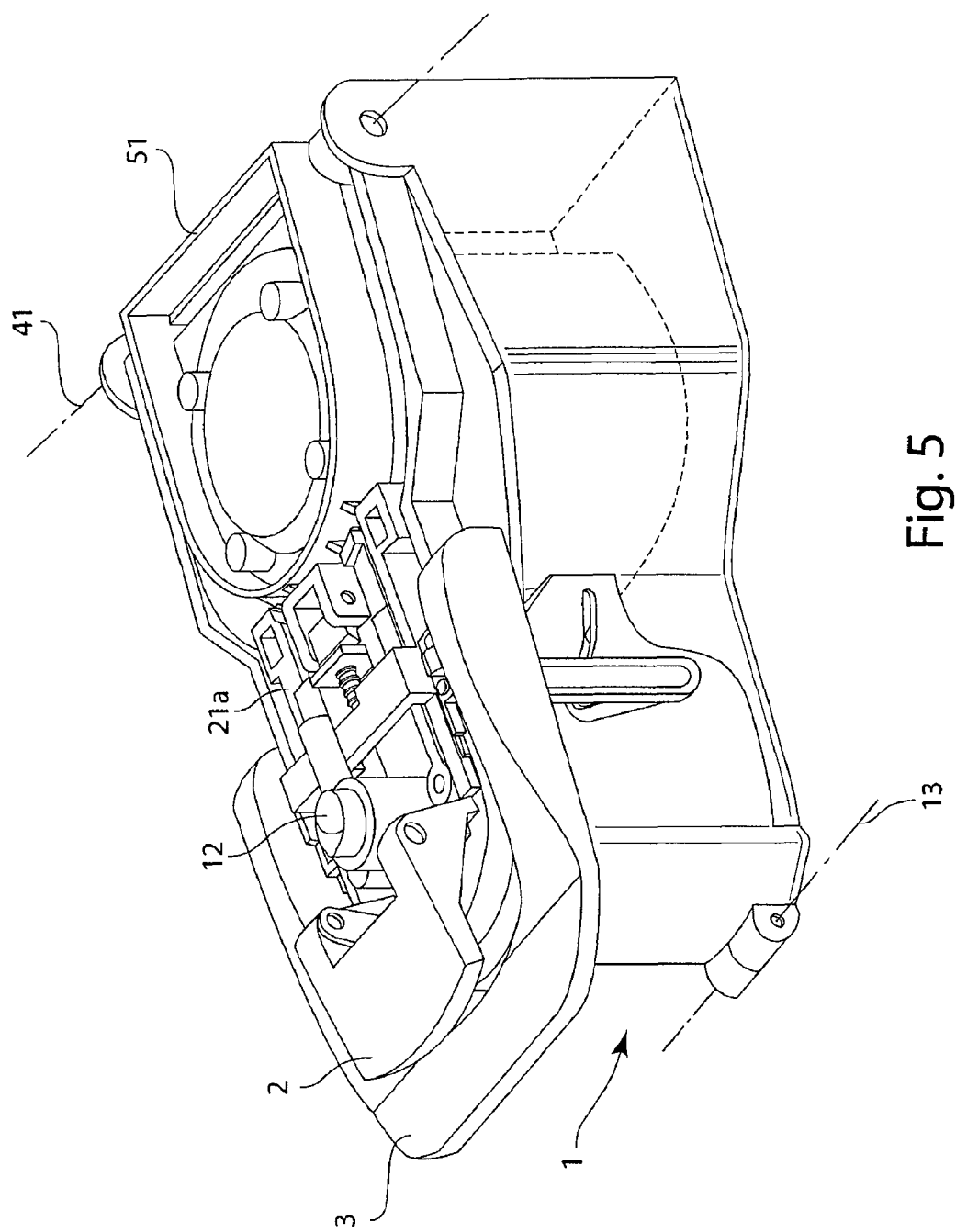

FIGS. 4-8 show the arrangement of FIGS. 2 and 3 in various states of operation. FIG. 4 shows an initial configuration with the brew chamber 1 closed and the reservoir lid 51 closed, i.e., a configuration in which a user might typically find the beverage forming device 10 after a beverage has just been made. To start the process for forming a new beverage, the user may open the brew chamber 1, e.g., by depressing the lever 2, which causes the slider 21a to move rearwardly against a spring bias, as shown in FIG. 5. Rearward movement of the slider 21a causes the slider 21a to disengage from the portion 61 of the frame 6, allowing the lid carrier 42 to be raised by lifting of the handle 3. The lid carrier 42 may be biased to move upwardly, e.g., under a spring or other bias, or may be arranged to require the user to support and lift the lid carrier 42.

Figure 6:
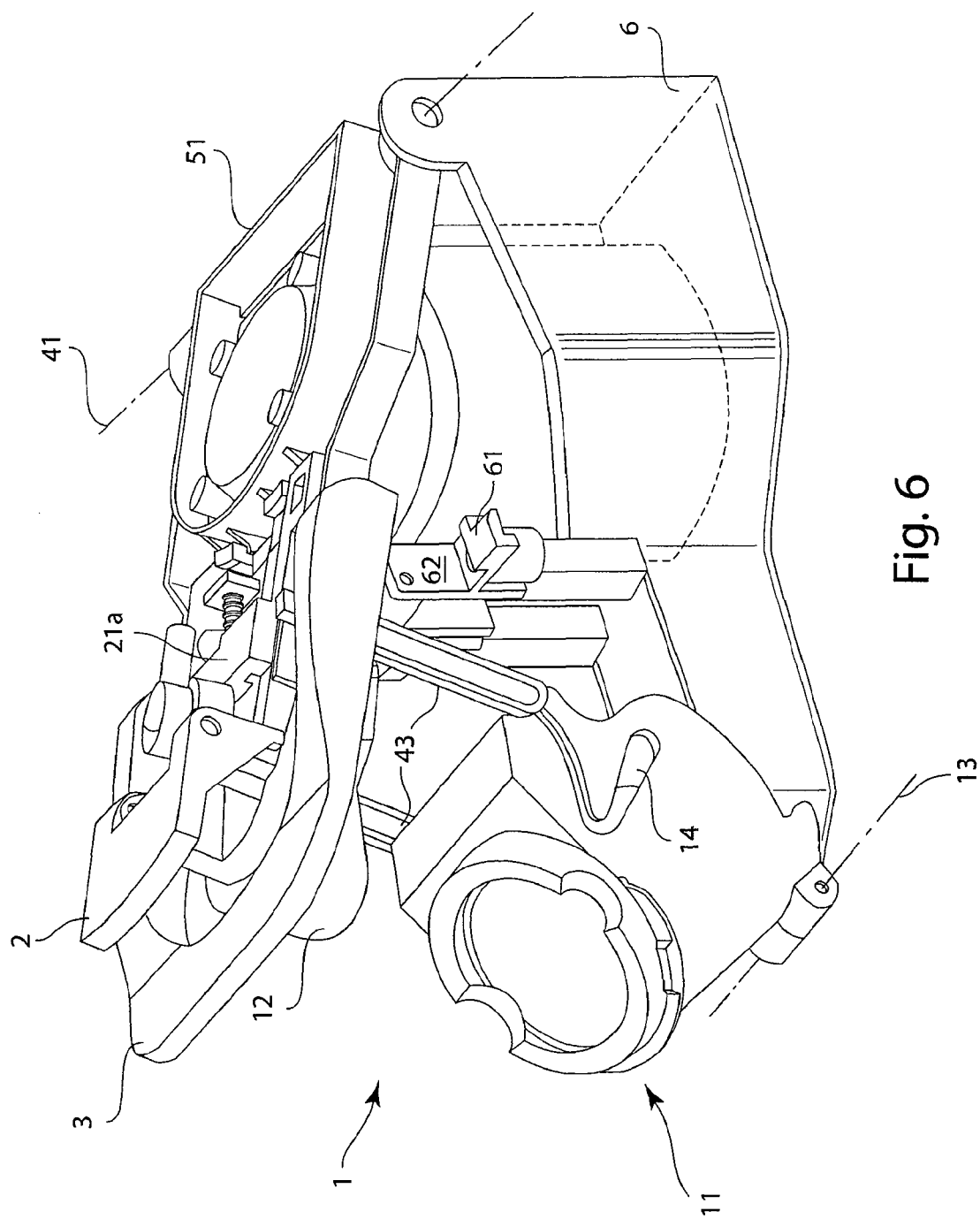

With the lid carrier 42 fully lifted as shown in FIG. 6, the cartridge receiver 11 is tilted forward and positioned to receive a cartridge for brewing a beverage. A detent or other arrangement may be employed to maintain the lid carrier 42 in a lifted condition, e.g., to help prevent inadvertent closing of the brew chamber 1. As mentioned above, lifting of the lid carrier 42 and engagement of the arms 43 with the slots 14 in the receiver 11 causes the receiver 11 to tilt forward about the axis 13. Although in this embodiment the cartridge receiver 11 pivots forward about an axis 13 based on engagement of arms 43 with a slot 14 in the cartridge receiver 11 to allow for easier handling of the cartridge, the cartridge receiver 11 may be moved manually, may remain stationary, and/or may move in other ways. In the condition shown in FIG. 6, the reservoir lid 51 is opened from a closed position (in which the lid 51 seals the reservoir 5), but the reservoir lid 51 still covers the access opening to the reservoir receptacle so that a user may not pour water into the reservoir 5. Thus, although the access opening is slightly opened, the access opening is not exposed.

Figure 7:
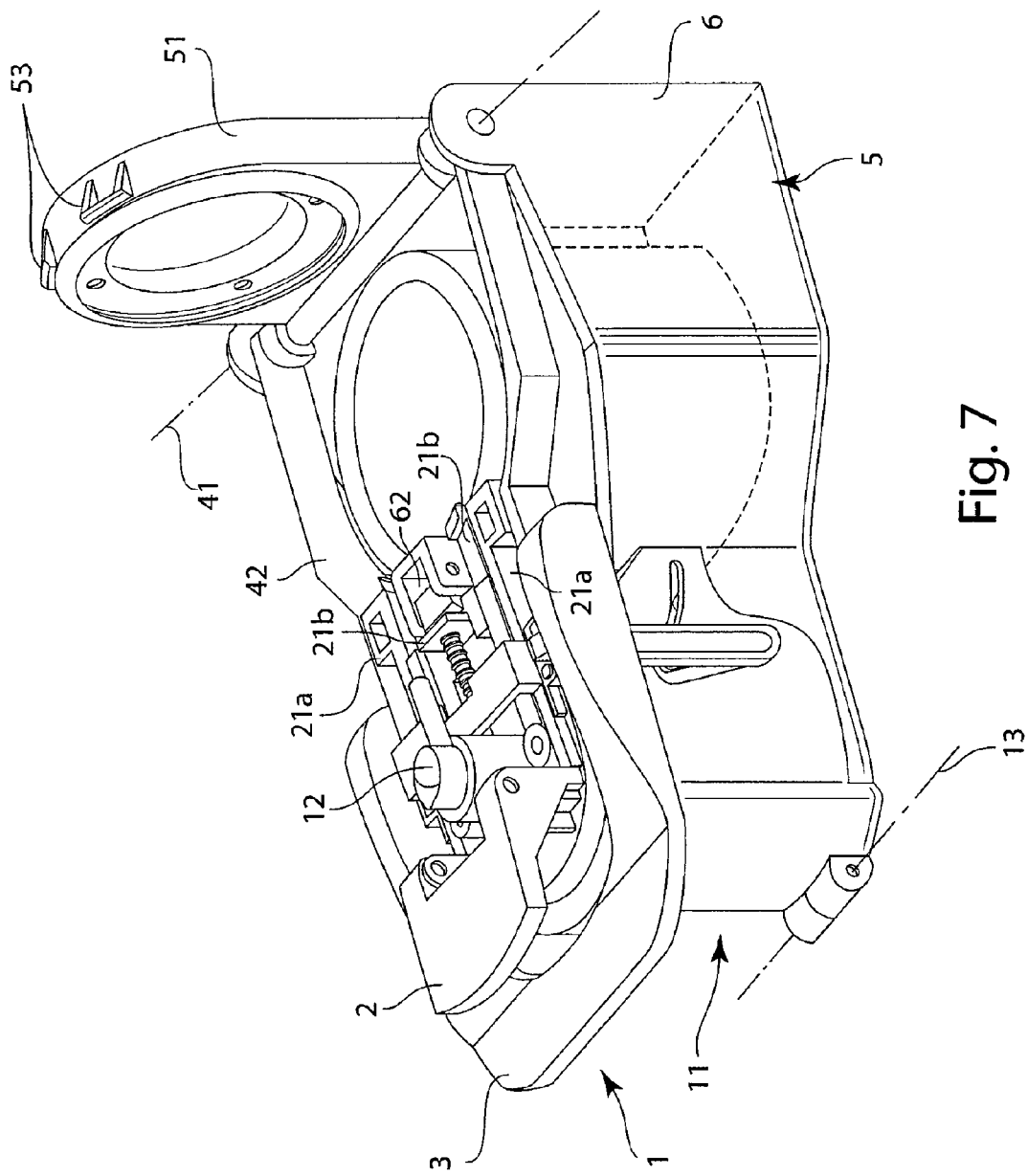
Figure 8:
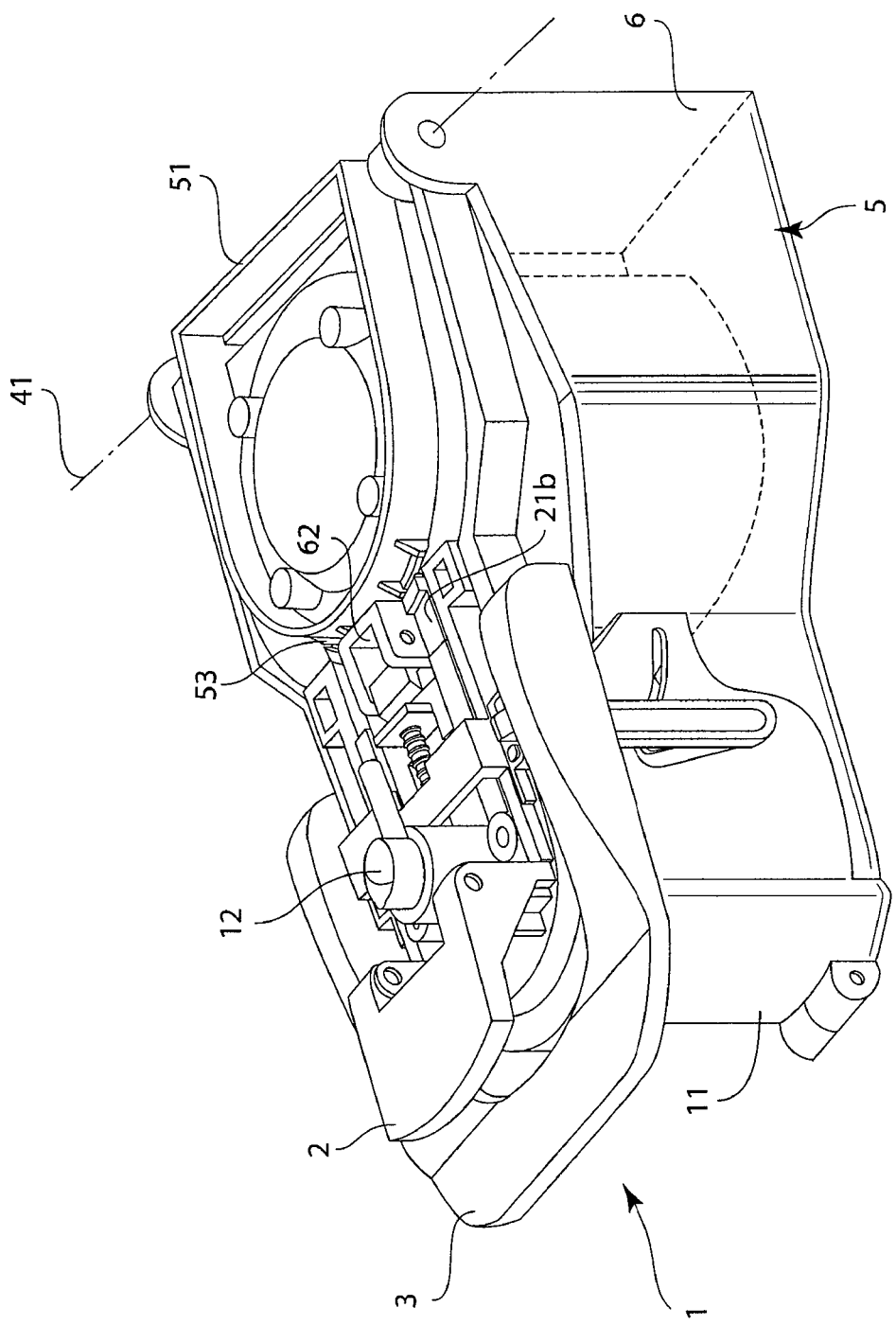

With a cartridge (not shown) placed in the cartridge receiver 11 (and a spent cartridge removed from the receiver 11 if necessary), the handle 3 may be depressed as shown in FIG. 7 to close the brew chamber lid 12 and thus the brew chamber 1. When the brew chamber 1 is fully closed, the slider 21a may re-engage with the portion 61 of the frame 6 so as to lock the lid carrier 42 in a closed position. The reservoir lid 51 may travel with the lid carrier 42 until the brew chamber lid 12 is nearly closed or closed and the slider 21b engages with a portion 62 on the frame 6, which causes the slider 21b to disengage from the tab portions 53 on the reservoir lid 51. This allows the reservoir lid 51 to pivot freely on the lid carrier 42, e.g., about the axis 41 to an open position shown in FIG. 7 to allow access to the reservoir 5. The reservoir lid 51 may have a spring bias that urges the lid 51 to move to the position shown in FIG. 7. Thus, when the slider 21b disengages from the lid 51, the lid 51 may move abruptly to the position shown in FIG. 7. This may draw the user's attention to the fact that water should be provided in the reservoir 5 for brewing.

In this embodiment, the reservoir 5 is sized to receive only enough water for the preparation of one cup of beverage (e.g., 6, 8, 10 or 12 ounces), and the device 10 is operated to empty the reservoir 5 during each brew cycle. Thus, the reservoir 5 in this embodiment needs refilling after each completed brew cycle. This embodiment may be useful in certain applications, such as hotel use or other circumstances when it may not be desired to store water in the brewer. Of course, in other embodiments, the reservoir 5 may have a larger capacity, or be provided water from a separate storage tank or a plumbed connection. After water is provided in the reservoir 5, the user may push the reservoir lid 51 down so that it locks in place on the lid carrier 42 (the tab portions 53 engage with the slider 21b—shown in FIG. 8) and pneumatically seals the reservoir 5 closed. By a pneumatic seal, it is meant that the lid 51 provides a suitable seal of the reservoir 5 to allow pneumatic delivery of water in the reservoir to the cartridge, as described in more detail below.

In this embodiment, the slider 21b and the frame portion 62 form a lid control mechanism that functions to lock the reservoir lid 51 in a position to block access to the access opening while the brew chamber lid 12 is open and unlocks the lid 51 to allow access to the access opening when the brew chamber lid 12 is moved toward the closed position. However, it should be understood that a lid control mechanism may include other components that provide the same or similar function. For example, the lid control mechanism may include a solenoid-activated latch that is triggered to release the lid 51 from a locked position on the lid carrier 42 upon closure of a switch when the lid carrier 42 is lowered to close the brew chamber 1. In another embodiment, the lid control mechanism may include a motor that is actuated to drive the lid 51 to move toward an open position in response to initiation of closure of the brew chamber 1, e.g., as sensed by a photodetector, switch or other detector. In accordance with another aspect of the invention, the lid control mechanism may be altered to function in a different way, e.g., to cause simultaneous and automatic opening of the reservoir lid 51 upon opening of the brew chamber lid 12. For example, the slider 21b and the frame portion 62 may be arranged to unlock the lid 51 from the lid carrier 42 when the user lifts the handle 3 with the brew chamber lid 12 in the closed position. Alternately, the slider 21a may engage with the lid 51 so as to lock the lid in a closed position with the brew chamber 1 closed, and release the reservoir lid 51 upon depression of the lever 2. Other arrangements are possible, such as a push button function whereby a user presses a push button, which causes the brew chamber lid 12 and the reservoir lid 51 to move toward respective open positions whether by motorized, manual, electro-mechanical or other means.

Figure 9:
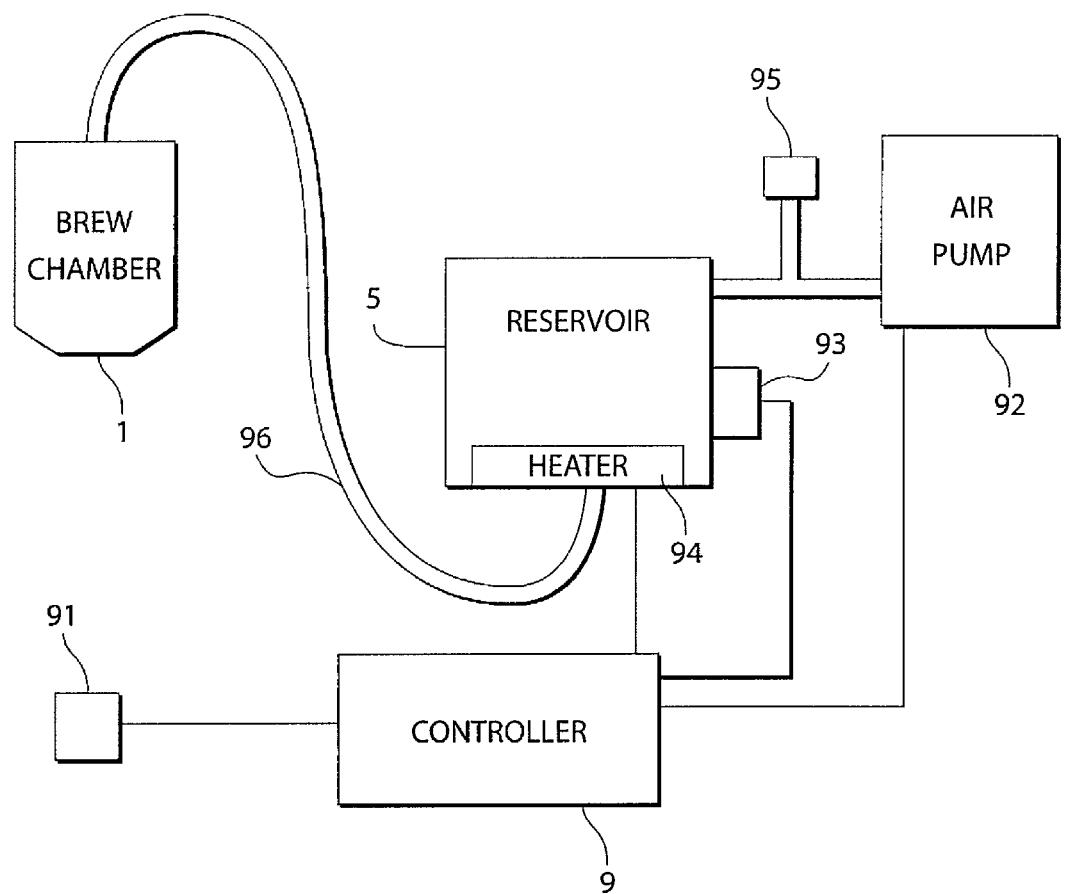
FIG. 9 is a schematic block diagram of a beverage formation device in accordance with aspects of the invention.

FIG. 9 shows a schematic diagram of a beverage forming device 10 in accordance with aspects of the invention, e.g., the device 10 shown in FIGS. 1-8. With a fresh cartridge provided in the brew chamber 1 and water in the reservoir 5, the user may press a brew button (such the power button 91) to cause the brewer to start a brew cycle. In accordance with one aspect of the invention, initiation of a brew cycle may begin with heating of the water in the reservoir 5, and when the water is sufficiently heated, delivery of the water to the brew chamber may be initiated. Heating of the water may be done in any suitable way. For example, a controller 9 may control the heater 94 to begin heating of the water in the reservoir 5, e.g., by an electrical resistance heater in or around the reservoir 5, a heater in the line 96 leading from the reservoir 5 to the brew chamber 1, or otherwise arranged to heat the water. Once the water is heated to a desired temperature, a thermal cut off (TCO) switch 93 associated with the reservoir 5 may open and cause power to be cut off to the heater 94, e.g., the TCO switch 93 may be arranged in the power supply line to the heater 94. (In some embodiments, sufficient heating of the water may be sensed in other ways, such as by a thermocouple, or other sensor.) In accordance with an aspect of the invention, the controller 9 (e.g., which may include a microprocessor for performing data processing functions, a memory for storing data and/or operating instructions, communication buses or other devices, software or other computer-executable instructions, a power supply or other power source such as a plug for mating with an electrical outlet, relays, mechanical linkages, user data input devices such as buttons, a touch screen or other, information display devices such as an LCD display, indicator lights or other, and/or other components for providing desired control functions) may detect the opening of the TCO (such as by detecting a drop in voltage at the heater 94) and in response cause delivery of water to the brew chamber 1, e.g., control an air pump 92 to begin operation. The air pump 92 may deliver air under pressure to the reservoir 5 to cause the pressure in the reservoir 5 to rise, causing heated water to be forced from the reservoir 5 to the brew chamber 1 via a line 96. The reservoir 5 may have an outlet at or near the bottom of the reservoir 5 so that heated water is forced from the outlet and into the line 96 (which may include a check valve to help prevent backflow of fluid in the line 96). Heated water or other precursor liquid that is provided to the brew chamber may enter a beverage cartridge in the brew chamber 1 via an inlet needle that punctures the cartridge when the brew chamber lid 12 closes the brew chamber 1. The water may contact the beverage medium in the cartridge and a formed beverage may exit the cartridge, e.g., via an exit needle that punctures a bottom side of the cartridge. The air pump 92 may run for a specified period of time, e.g., 60 seconds, or otherwise controlled (e.g., by detecting a drop in pressure in the reservoir 5 signifying an absence of liquid) to empty the reservoir 5 of all water or other liquid. The timing of the air pump operation may be arranged so that mainly air is pumped at the end of the cycle, e.g., to help purge the cartridge of any remaining beverage, as well as to help dry the reservoir 5 and the line 96.

As described above and in accordance with one aspect of the invention, the reservoir 5 may be vented to allow escape of steam or other pressurized gas during heating of the water, but not interfere with pneumatic delivery of water from the reservoir 5 to the brew chamber 1. For example, an orifice 95 arranged in the connection between the air pump 92 and the reservoir 5 may be suitably arranged to properly vent the reservoir 5 during heating (e.g., to prevent substantial delivery of water from the reservoir 5 to the brew chamber 1 until the air pump 92 is operated), and be arranged so that pressurization of the reservoir 5 by the air pump 92 causes desired delivery of water to the brew chamber 1. In one illustrative embodiment, the orifice has a diameter of approximately 0.012 inch.

In one embodiment, the brewer may include a cup or mug sensor 97 that detects whether a container is positioned to receive a beverage as it exits the brew chamber 1 and cartridge. If a container is not detected, the controller 9 may prevent the brewer from operating, e.g., may prevent water heating, air pump operation, etc. Also, if the cup sensor detects that the container is removed during a brew cycle (e.g., during water heating or delivery of heated water to the cartridge), the controller 9 may stop brewer operation (stop heating or water delivery.) The brew cycle may be resumed if the container is detected to be replaced. The cup sensor may take any suitable form, such as an LED and photodetector.

In another aspect of the invention, the controller 9 may include a feature that powers up the device 10 upon detection that the brew chamber 1 has been opened. In accordance with this aspect of the invention, a user need not be required to turn the device 10 on when seeking to make a beverage, e.g., by pressing the power button 91, but instead may simply lift the handle 3 or otherwise open the brew chamber 1 and place a new cartridge in the brew chamber 1. Upon closing of the brew chamber 1 and the reservoir lid 51 (indicating that a new cartridge has been placed and water has been provided in the reservoir 5), the controller 5 may begin the brew cycle (e.g., water heating, followed by water delivery to the brew chamber). The controller 9 may include one or more sensors to detect opening/closing of the brew chamber 1 and/or the reservoir lid 51 to power up the device 10 and/or initiate a brew cycle. Such sensors may include a microswitch that is opened/closed upon movement of the lid carrier 42, the brew chamber lid 12, the reservoir lid 51, the lever 2 and/or other suitable components. Power up of the device 10 may be triggered, for example, by a switch detecting movement of the brew chamber lid 12 or lid carrier 42 from the closed position toward the open position, and/or by depression of the lever 2. In one embodiment, a switch may provide a brew indication signal by detecting the closure of the reservoir lid 51. Since in the embodiment described above the reservoir lid 51 cannot be fully closed unless the brew chamber 1 is closed, the reservoir lid switch may detect that both a new cartridge has been placed, as well as provision of water into the reservoir 5, allowing the controller 9 to initiate a brew cycle upon closure of the reservoir lid 51. The sensor(s) may alternately, or in addition, detect the presence of a cartridge in the brew chamber 1, water or other liquid in the reservoir 5 and/or other features for suitable control of the device 10. Accordingly, the device 10 may receive a brew indication from a user to start a brew cycle in a variety of different ways, e.g., by closing the reservoir lid 51, by pressing a power button 91 or other user input, by placing a cup or other receptacle under the brew chamber or otherwise to receive a beverage, and so on.

The above and other aspects of the invention will be appreciated from the detailed description and claims. It should be understood that although aspects of the invention have been described with reference to illustrative embodiments, aspects of the invention are not limited to the embodiments described. Also, aspects of the invention may be used alone, or in any suitable combination with other aspects of the invention.

The invention claimed is:

1. A beverage formation device, comprising:
a brew chamber for receiving a beverage cartridge and having a lid that is movable between open and closed positions to open and close the brew chamber, the brew chamber adapted to partially enclose a beverage cartridge with the lid in a closed position;
a reservoir for holding a beverage precursor liquid and having a lid that is movable to open and close an access opening through which precursor liquid is provided into the reservoir;
a heater for heating the precursor liquid that is provided to the brew chamber; and
means for controlling the reservoir lid to prevent movement of the reservoir lid to a position that allows access to the access opening while the brew chamber lid is open and to permit movement of the reservoir lid to allow access to the access opening when the brew chamber lid is moved from the open position to the closed position.

\* \* \* \* \*